Nov. 16, 1943.   R. L. HARTWELL   2,334,263
FORAMINOUS BODY AND METHOD OF PRODUCING THE SAME
Filed June 3, 1941   2 Sheets-Sheet 1
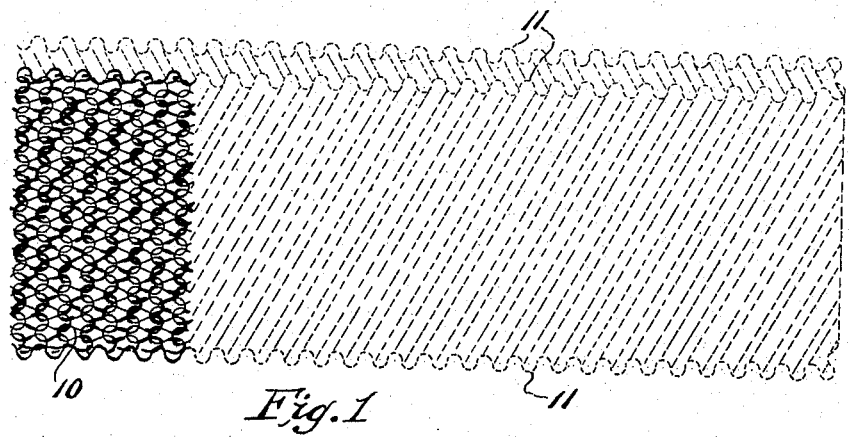
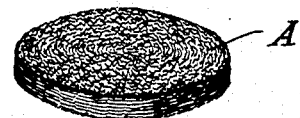
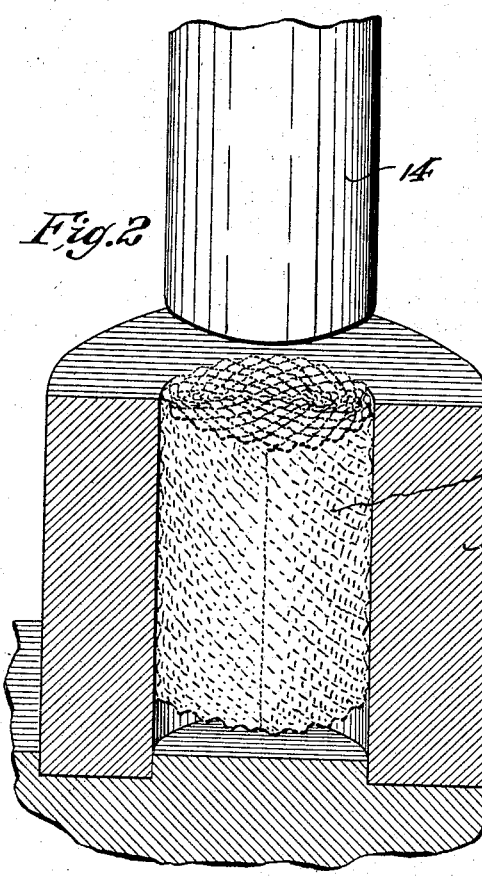
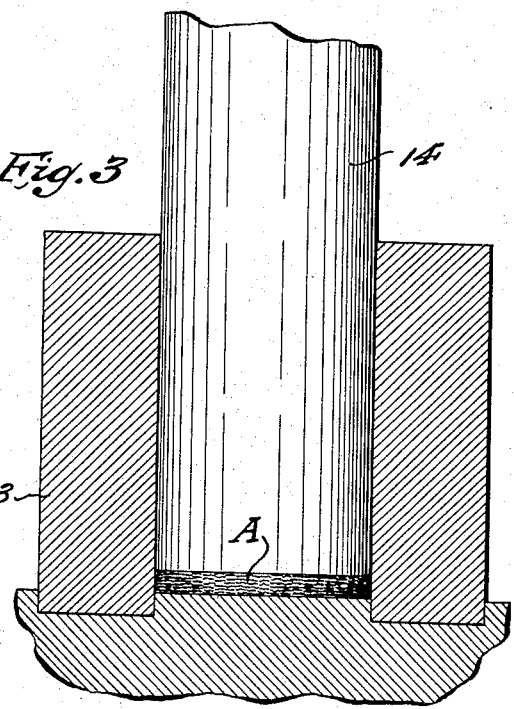
INVENTOR.
Ralf L. Hartwell,
BY George L. Richards,
ATTORNEY.

Nov. 16, 1943.  R. L. HARTWELL  2,334,263
FORAMINOUS BODY AND METHOD OF PRODUCING THE SAME
Filed June 3, 1941  2 Sheets-Sheet 2

INVENTOR.
Ralf L. Hartwell,
BY George D. Richards
ATTORNEY.

Patented Nov. 16, 1943

2,334,263

UNITED STATES PATENT OFFICE 2,334,263

FORAMINOUS BODY AND METHOD OF PRODUCING THE SAME

Ralf L. Hartwell, Orange, N. J., assignor to Metal Textile Corporation, West Orange, N. J., a corporation of Delaware Application June 3, 1941, Serial No. 396,482

13 Claims. (Cl. 210—169)

This invention relates to filter or strainer or other foraminous bodies of novel form and structure and to methods of producing the same.

This invention has for an object to provide a foraminous filter or strainer or other body of novel form and structure which is produced from metallic open mesh fabric, said fabric being processed and compressed into a body mass of desired interstitial character, whereby to furnish a durable filter or strainer which is substantially self supporting and of a strength well calculated to withstand considerable pressure without deformation, fracture or other damage.

In the making and use of filter or strainer bodies of metallic fabrics for the filtration of fluids, it is the general practice to employ woven wire mesh having openings sufficiently small to prevent passage of the smallest particles suspended in the fluid whereby to separate the former from the latter. In the case of fluids containing suspensions of very fine particles it is necessary to employ exceedingly fine wire gauze or like fabrics to obtain required small strainer openings, frequently of two thousandths of an inch or less in size. Not only is such wire gauze or the like very costly, but is also of but poor mechanical strength and unable to withstand any considerable pressure, being therefore short lived in use. Having these things in view, it is another object of this invention to provide a novel form and construction of filter or strainer body which can be produced from a metallic fabric made of comparatively heavy gauge wire and having, initially, relatively large mesh openings, and yet said fabric being so processed and manipulated as to furnish a filter or strainer container openings or interstices of exceedingly small size, when such are desired.

Other objects of this invention, not at this time more particularly enumerated, will be understood from the following detailed description of the same.

The accompanying drawings show various embodiments of this invention, including steps of the method procedure whereby the same are produced. In said drawings, Fig. 1 is a schematic view of a knitted metallic mesh fabric partially processed ready to be rolled upon itself and compressed into the ultimate filter or other foraminous body mass according to this invention; Fig. 2 is a view of the mesh fabric rolled and deposited in dies for compressing the same, the female die being shown in section; Fig. 3 is a view similar to that of Fig. 2, but showing the rolled mesh fabric compressed to a filter or other foraminous body forming mass by the dies; and Fig. 4 is a perspective view of a completed filter or foraminous body formed from the material shown in Fig. 1.

Figure 5:
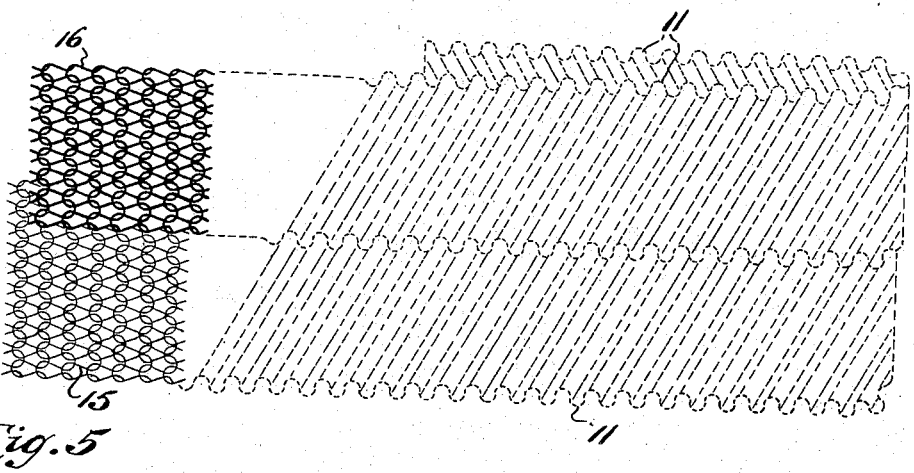
Fig. 5 is a schematic view of a modified form and arrangement of knitted metallic mesh fabric materials from which a filter or foraminous body is to be formed.

In a simple embodiment of this invention, as shown in Fig. 4, the filter or foraminous body is produced as follows:

A strip of knitted metallic mesh 10 of suitable width and length is provided. Such mesh strip may be knitted from round or flat wire of selected gauge and of a desired metal. The mesh may be either flat or tubular knit, but preferably the latter. The knitted strip may be more or less loosely knit so that the interlinked loops initially provide a comparatively open mesh material; i. e., a material having mesh openings which are initially much too large to serve as the relatively small fluid passage openings which are desired to be provided in the ultimate filter or strainer body.

The metallic mesh strip is first run through corrugating rolls so as to form therein successive crimps or corrugations 11 extending obliquely across the mesh strip at a selected angle other than 90 degrees. After the mesh strip 10 has been corrugated, the same is folded lengthwise upon itself to form a plurality of superposed plies, and so that the crimps or corrugations of contiguous plies cross one another in non-nesting relation. The thus folded mesh strip is now tightly rolled lengthwise upon itself into a cylindrical body 12 of predetermined diameter (see Fig. 2).

To complete the filter or strainer body, the mesh cylinder 12 is subjected to compression in the direction of its length, the mesh being disposed edgewise to the direction of compression. This may be done in any suitable manner, but preferably by means of a stationary female die 13, in which the mesh cylinder 12 is deposited, with which cooperates a movable male die 14, which is adapted to enter and move downwardly through the female die so as to compress the mesh cylinder 12, and thus form the compacted ultimate filter or strainer body A. The male die may be actuated in any suitable manner to force the same with compressive action against the mesh cylinder 12, as, e. g., by means of a hydraulic press mechanism (not shown), to the plunger of which said male die is connected.

As the mesh cylinder 12 is forcibly compressed and compacted, the corrugated contiguous coils of the same are interlocked one with another, and the mesh is firmly compacted into a disc-like body of substantial thickness, and so as to close the mesh openings and force the wire strands of the mesh into mutually abutting relation, whereby only very small interstices are formed adjacent intersecting portions of such abutting wire strands. The small interstices thus formed intercommunicate throughout the mass of the body, and consequently the body possesses a foraminated internal structure ideally adapted to perform the desired filtering or straining function.

Owing to the corrugated formation of the strip from which the mesh cylinder 12 is formed, when the latter is subjected to endwise applied pressure and compressed, the crushing down of the convolute mesh strip layers of the cylinder 12 causes the corrugate bends in the interlinked loops to interweave and interlock one with another as said cylinder is collapsed and flattened down into the compact foraminous mass which constitutes the finished filter or strainer body. Not only does this produce the ramified interstices which form the fluid passages through the filter or strainer body, but also tends to interlace portions of the wire strands of contiguous loops of the knitted mesh so as to non-separably interlock the same into a durable, strong, self-sustaining and stable body mass which is capable of withstanding considerable fluid pressure without risk of deformation or disintegration in use.

A filter or strainer body of the character and made by the procedure above described may be produced in a foraminous structure the openings of which are exceedingly small, so as to strain from a fluid very fine suspended particles. For example, the filter or strainer body may be made of a fabric knitted from flat or ribbon-like wire of copper or other selected metal having a thickness, e. g., of approximately twelve ten thousandths of an inch. When such fabric is manipulated as above described to produce the filter or strainer body, the openings or interstices formed at points where one ribbon-like portion intersectingly overlaps another will not exceed the thickness of said ribbon-like strand or wire, and consequently the filter or strainer body will, in use, very efficiently separate exceedingly fine suspensions from a fluid passed therethrough, while nevertheless the durable, strong, non-deformable and pressure resistant characteristics of the body, due to the described structure thereof, are attained.

Figures 6, 8:
Fig. 6 is a perspective view of the completed filter or strainer body formed therefrom.
Fig. 8 is a perspective view of the finished filter or foraminous body formed therefrom.
Figure 7:
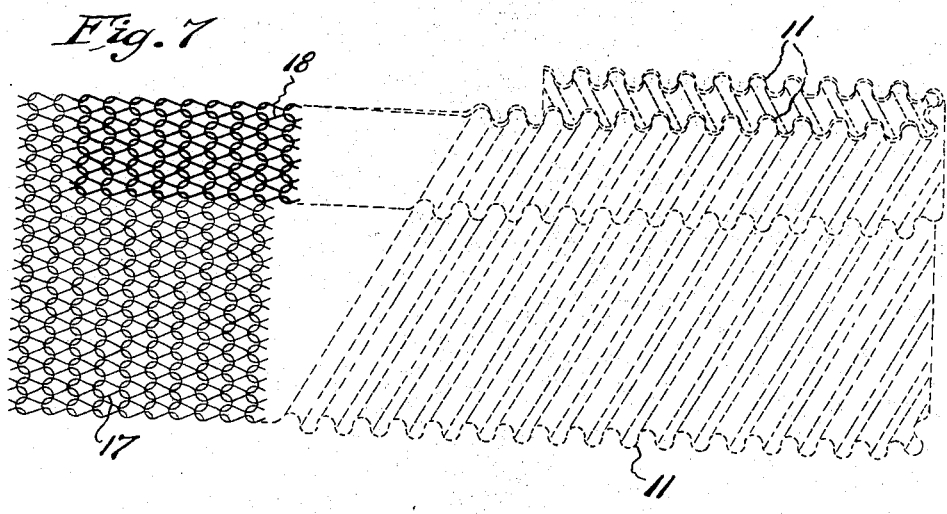
Fig. 7 is a schematic view of another modified form and arrangement of knitted metallic mesh fabric materials from which a filter or foraminous body is to be formed.

A somewhat modified embodiment of this invention, as shown in Fig. 6, provides a filter or strainer body having at its receiving face portion a comparatively coarse interstitial structure B and at its discharge face portion a relatively fine interstitial structure C. The filter or strainer body thus modified is produced as follows:

A strip of knitted metallic mesh 15 made, e. g., from a round strand or wire of comparatively small gauge or of a flat or ribbon-like strand or wire of small thickness is provided. Superposed upon this mesh strip 15, so as to somewhat overlap the upper marginal portion thereof, and so as to extend therefrom, is a second strip of knitted metallic mesh 16 made from a round strand or wire of relatively heavier gauge. The thus overlapped strips 15 and 16 are run together through corrugating rolls; the strips thereupon folded lengthwise upon themselves; and then rolled into a cylindrical body in the manner already described. The cylindrical body thus obtained is then compressed and compacted by the dies 13—14 to thereby convert the cylindrical body into a finished disc-like filter or strainer body. Where the strips 15 and 16 overlap, the same will be interlocked together, while the free portions of the strip 16 will be compressed and compacted into a foraminous layer B of comparatively coarse interstitial structure, while the free portions of the strip 15 will be compressed and compacted into a foraminous layer C of relatively fine interstitial structure; the two layers being interlocked together where the mesh strips of which they are composed overlap, as above stated. In this manner, a unitary filter or strainer body is provided which, in use, may be positioned to dispose its coarse side for the reception of a fluid to be strained therethrough and its fine side disposed to discharge said fluid. The coarse portion of the filter or strainer body will separate contained coarser particles from the fluid, while the finer portion will separate the contained finer particles from said fluid. The fluid is thus caused to undergo a preliminary straining which clears the coarse particles therefrom, whereby to prevent clogging of the fine interstices of filter or strainer body thereby, and thus improving the efficiency of the filter and assuring a longer period of effective performance.

Another modified embodiment of this invention, as shown in Fig. 8, provides a filter body D, having a reenforcing means E built thereinto, the same being produced as follows:

A strip of knitted metallic mesh 17 made, e. g., from a round strand or wire of selected gauge or of a flat or ribbon-like strand or wire of selected thickness is provided. Superposed upon this mesh strip 17, in registration with a marginal edge portion thereof, is a narrow strip or band of knitted metallic mesh 18 made from a round strand or wire of comparatively heavy gauge. The strips 17 and 18 are run together through corrugating rolls, then folded lengthwise upon themselves, and thereupon rolled into a cylindrical body preparatory to compression; the cylindrical body being thereafter compressed and compacted in dies to convert the same into the finished disc-like filter or strainer body. The convolutions of the mesh strip 18 will be imbedded to a desired depth, according to the width thereof as compared with the width of the main mesh strip 17, in a face portion of the filter or strainer body, thereby providing a reenforcing means E which serves to add mechanical strength to the filter or strainer body whereby to increase its ability to withstand fluid pressure in use. Furthermore, when the filter or strainer body is positioned in use with such reenforced face portion disposed to receive the fluid to be strained, the coarser reenforcing layer will provide somewhat larger interstices as compared with the interstices of the main portions of the body, whereby entering channels are provided adapted to lead the fluid to the interior of the body, so as to cause the fluid to quickly and uniformly spread throughout the entire mass of said body.

It has been pointed out that it is preferable to angularly corrugate the metallic mesh strip or strips prior to folding and rolling the same into the cylindrical formation preparatory to compression and compacting thereof, since the corrugations aid in producing a better and stronger interlocking together of the mesh plies and loops when the material is compressed to the finished filter or strainer body mass. It must be understood, however, that the mesh strips may be otherwise roughened to this end, and that even uncorrugated or unroughened mesh strips may be rolled and then compressed to filter or strainer body form, although in such case the resultant body will not be quite so firm or resistant to deformation.

It may also be pointed out that a loose knitted metallic mesh fabric is the most suitable to provide the base material from which the filter or strainer body is made, due to the ease with which it interlocks and binds together when compressed to the ultimate body form; it is possible, however, to produce a more or less satisfactory filter or strainer body from other types of woven, braided or knitted metallic mesh material.

While I have specifically described my invention as applied to the formation of foraminous filter or strainer bodies, it will be understood that the same may also be applied for the formation of like bodies for other purposes.

I am aware that various changes and modifications of form both as to material and finished foraminous body, other than those already hereinabove referred to, could be made, and many apparently widely different embodiments of this invention could be made without departing from the scope thereof as defined by the following claims. It is therefore intended that all matter contained in the above description or shown in the accompanying drawings shall be interpreted as illustrative and not in a limiting sense.

I claim:

1. A method of producing a foraminous body comprising, the provision of a strip of metallic mesh fabric of selected width and length, forming transversely extending corrugations in said strip, rolling said strip upon itself into a substantially cylindrical mass wherein the mesh plies stand edgewise and parallel to the longitudinal axis of said mass, and then compressing said mass by axially applied force whereby to collapse and laterally interlock its corrugate plies and thus consolidate the same into a compacted self-sustaining stable foraminous body.

2. A method of producing a foraminous body comprising, the provision of a strip of metallic mesh fabric of selected width and length, forming oblique corrugations across the width of said strip, folding said strip upon itself so that the corrugations of the contiguous plies thereof cross one another, rolling the folded strip upon itself into a substantially cylindrical mass wherein the mesh plies stand edgewise and parallel to the longitudinal axis of said mass, and then compressing said mass by axially applied force whereby to consolidate the same into the desired compacted foraminous body wherein the mesh layers forming the same are collapsed and mutually strongly interlocked together.

3. A method of producing a foraminous body comprising, the provision of a strip of knitted metallic mesh of selected width and length, forming transversely extending corrugations in said strip, rolling the corrugated strip upon itself into a substantially cylindrical mass wherein the mesh plies stand edgewise and parallel to the longitudinal axis of said mass, and then compressing said mass by axially applied force whereby to collapse and laterally interlock its corrugate plies and thus consolidate the same into a compacted self-sustaining stable foraminous body.

4. A method of producing a foraminous body comprising, the provision of a strip of knitted metallic mesh of selected width and length, forming oblique corrugations across the width of said strip, folding said strip upon itself so that the corrugations of the contiguous plies thereof cross one another, rolling the folded strip upon itself into a substantially cylindrical mass wherein the mesh plies stand edgewise and parallel to the longitudinal axis of said mass, and then compressing said mass by axially applied force whereby to collapse and laterally interlock its corrugate plies and thus consolidate the same into a stable compacted foraminous body.

5. A method of producing a foraminous body comprising, the provision of a strip of metallic mesh of selected width and length knitted from a flat ribbon-like metallic strand of selected thickness, forming oblique corrugations across the width of said strip, folding said strip upon itself so that the corrugations of the contiguous plies thereof cross one another, rolling the folded strip upon itself into a substantially cylindrical mass wherein the mesh plies stand edgewise and parallel to the longitudinal axis of said mass, and then compressing said mass by axially applied force whereby to collapse and laterally interlock its corrugate plies and thus consolidate the same into a stable compacted foraminous body.

6. A method of producing a foraminous body comprising, the provision of one strip of mesh fabric of selected width and length knitted from a comparatively fine metallic strand and the provision of another strip of mesh fabric of selected width and corresponding length knitted from a relatively coarse metallic strand, superposing said strips in suitably lapped relation to provide a composite strip, forming corrugations across the width of said superposed strips, rolling the composite strip upon itself into a substantially cylindrical mass whereby the mesh plies stand edgewise and parallel to the longitudinal axis of said mass, and then compressing said mass by axially applied force whereby to laterally collapse and interlock the corrugations of contiguous plies together and thus consolidate the same into a stable compacted foraminous body.

7. A method of producing a foraminous body comprising, the provision of one strip of mesh fabric of selected width and length knitted from a comparatively fine metallic strand and the provision of another strip of mesh fabric of selected width and corresponding length knitted from a relatively coarse metallic strand, superposing said strips in suitably lapped relation to provide a composite strip, forming oblique corrugations across the width of the composite strip, folding the corrugated composite strip upon itself so that the corrugations of the contiguous plies thereof cross one another, rolling the folded composite strip upon itself into a substantially cylindrical mass wherein the mesh plies stand edgewise and parallel to the longitudinal axis of said mass, and then compressing said mass by axially applied force whereby to collapse and laterally interlock its corrugate plies and thus consolidate the same into a stable compacted foraminous body.

8. A foraminous body of self-sustaining substantially stable form comprising a strip of metallic mesh material having corrugations extending across the same and being rolled into a cylindrical mass wherein the convolute plies thereof stand edgewise and parallel to the longitudinal axis of said mass, said mass being axially compressed into a consolidated body formation wherein the corrugations of contiguous convolute plies are laterally collapsed and interlocked together.

9. A foraminous body of self-sustaining substantially stable form comprising a mesh strip knitted from metallic strands, said strip having corrugations extending across the same and being rolled into a cylindrical mass wherein the convolute plies thereof stand edgewise and parallel to the longitudinal axis of said mass, said mass being axially compressed into a consolidated body formation wherein the corrugations of contiguous convolute plies are laterally collapsed and interlocked together.

10. A strainer of self-sustaining substantially stable body form comprising a mesh strip knitted from a metallic strand, said strip having oblique corrugations extending across the same and being folded upon itself to dispose the corrugations of contiguous folds in crossed relation, said strip being rolled into a cylindrical mass wherein the convolute plies thereof stand edgewise and parallel to the longitudinal axis of said mass, and said mass being axially compressed and its plies edgewise collapsed and laterally deformed and interlocked together into a consolidated foraminous body.

11. A strainer of self-sustaining substantially stable body form comprising, a plurality of mesh strips, one said strip being knitted from a comparatively fine or thin metallic strand and the other from a relatively coarse metallic strand, said strips being superposed in a suitably lapped relation to provide a composite strip material, contiguously disposed plies of said composite strip material being arranged to form a mass wherein said plies are collapsed edgewise into laterally deformed mutually interlocked relation and compressed into a consolidated foraminous body, and wherein one section of the body constituted by the coarse strand knitted strip is of more open porosity than is the section constituted by the fine strand knitted strip.

12. A strainer of self-sustaining substantially stable body form comprising, a plurality of mesh strips, one said strip being knitted from a comparatively fine or thin metallic strand and the other from a relatively coarse metallic strand, said strips being superposed in a suitably lapped relation to provide a composite strip material, said composite strip material having oblique corrugations across the same, contiguously disposed plies of said composite strip material being arranged to form a mass with the corrugations of adjacent plies crossing one another and being collapsed edgewise and compressed into a consolidated foraminous body in which the corrugated plies are laterally deformed and mutually interlocked together, and wherein one section of the body constituted by the coarse strand knitted strip is of more open porosity than is the section constituted by the fine strand knitted strip.

13. A strainer of self-sustaining substantially stable body form comprising, a plurality of mesh strips, one said strip being knitted from a comparatively fine or thin metallic strand and the other from a relatively coarse metallic strand, said strips being superposed in a suitably lapped relation to provide a composite strip material, said composite strip material having oblique corrugations across the same and being folded upon itself so that the corrugations of contiguous plies thereof cross one another, said folded strip being rolled on itself to produce a substantially cylindrical mass wherein the plies stand edgewise and parallel to the axis of said mass, and said plies being collapsed edgewise and compressed into a consolidated foraminous body in which the corrugated plies are laterally deformed and mutually interlocked together, and wherein the imbedded coarse strand knitted strip reenforces the body mass.

RALF L. HARTWELL.